Feb. 26, 1963    C. B. GWYN, JR., ET AL    3,078,562
METHOD FOR ATTACHING SILVER-CADMIUM OXIDE
BODIES TO A SUPPORTING MEMBER
Filed Nov. 4, 1959
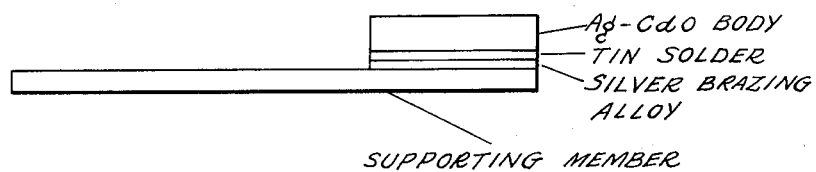
INVENTORS
CHILDRESS B. GWYN, JR.
NORMAN S. HOYER
BY
ATTORNEYS

United States Patent Office 3,078,562
Patented Feb. 26, 1963

3,078,562
METHOD FOR ATTACHING SILVER-CADMIUM OXIDE BODIES TO A SUPPORTING MEMBER
Childress B. Gwyn, Jr., Export, and Norman S. Hoyer, Pittsburgh, Pa., assignors to Gibson Electric Company, Delmont, Pa., a corporation of Pennsylvania
Filed Nov. 4, 1959, Ser. No. 850,814
7 Claims. (Cl. 29—473.1)

This invention relates to a novel method for attaching desired masses of materials which are used in electrical contact bodies to metallic supporting members.

Electrical contacts of silver and metal oxides or silver and graphite are, under normal operating conditions, suitable for repetitive make-and-break type applications because they have good conductivity, the properties of not welding or sticking upon repeated opening and closing. They also have a high resistance to wear and low loss of material per operation.

Satisfactory brazes of such contact compositions, and particularly silver-cadmium oxide contacts have been difficult to achieve by prior art methods. Such methods involved coating one or more of the component parts with various types of flux, and then placing a silver brazing alloy between or immediately adjacent the surfaces of the parts which it was desired to braze, and the subsequent heating of all of these to or somewhat above the melting and/or flow point of the silver brazing alloy. In order not to reduce deleteriously the cadmium oxide content to cadmium, this heating is usually performed in air, or in a substantially non-reducing atmosphere, such as nitrogen.

The silver alloy brazing materials only partially "wet" or penetrate the cadmium oxide portions of the silver-cadmium oxide bodies. This often results in the brazed assemblies failing to hold properly when subjected to the mechanical stresses accompanying their normal use, and early separation may take place. Moreover, the electrical conductivity is generally much lower than desirable.

Many added, often expensive, operations have been used in an effort to overcome these detrimental factors. Among the better known of these are the use of various acids or solutions for leaching out the cadmium oxides in the face to be brazed, previously cladding the silver-cadmium oxide brazing surface with a protective thickness of silver, electroplating or metallizing of the silver cadmium surfaces with silver, and preventing oxidation of the silver-cadmium oxide surface to be brazed, when the silver-cadmium oxide is produced by internal oxidation.

When the silver-cadmium oxide bodies are joined to a support by a soft solder and are applied in their normal melting range of about 300° F. to 600° F., a weak mechanical bond often results. Great care must be taken to see that the working (electrically operative) surfaces of these assemblies are not contaminated with lead, tin or the like from the soft solders and/or fluxes usually used with them.

Accordingly it is an object of this invention to provide a method which will produce assemblies of the silver-cadmium oxide bodies and supporting members of improved mechanical strength and electrical conductivity.

Another object of this invention is to produce assemblies of the silver-cadmium oxide bodies and supporting members by a method which is readily reproducible and which results in a quality product.

Further objects will become apparent from the detailed description which follows and from the drawing which illustrates a silver-cadmium oxide electrical contact joined to an electrically conductive metallic supporting member in accordance with the teachings of the present invention.

Essentially this invention relates to a method for attaching a contact body to ferrous and non-ferrous metallic supporting members. Examples of contact compositions to which the instant invention may be applied are those containing silver in combination with metallic oxides such as cadmium oxide, zinc oxide, tin oxide (SnO), lead oxide (PbO), and graphite. As previously stated, however, the instant method is particularly applicable to silver-cadmium oxide contacts, such as those described in United States Patents Nos. 2,861,155 and 2,890,315, owned by the instant assignee. The method involves the application of a soft solder to the oxide body, placing a silver brazing alloy over the solder-treated body, placing the desired surface of the supporting member against the silver brazing material, and heating all of the components in a suitable atmosphere to a temperature somewhat above the flow point of the silver brazing alloy until a satisfactorily permanent attachment is obtained between the silver-cadmium member and the supporting member.

More particularly we proceed by first "solder flushing" or coating the surface which is to be attached to the supporting member with an alloy and/or a mixture of tin and lead. Such alloy should contain at least 50 percent and preferably as high as 80 percent of tin, the remainder percentages substantially being lead and/or zinc in minor percentages.

This "tinning" or "solder flushing" is performed at temperatures in excess of 900° F. and preferably over 1100° F., in a neutral or non-reducing atmosphere or in vacuo. It will be noted that these temperatures are considerably higher than those normally required for or used in "soft soldering" and are sufficiently high to provide substantial penetration of the solder material into the contact point.

We have found that the resultant molten tin-lead both penetrates into and wets or coats the surface of the silver cadmium oxide body on which it was previously placed, and at the elevated temperatures the tin-lead also apparently coats over the cadmium oxide particles present while preventing their decomposition, also apparently wetting and/or alloying with the silver which surrounds or holds together the cadmium oxide particles.

Our next step is to place a properly dimensioned piece of silver brazing alloy having a melting point of at least 1000° F. upon this solder flushed surface and to then place the desired attaching surface of the support member against the silver brazing material. An example of a suitable silver brazing alloy would be "Sil-fos" a trademark of Handy and Harman Co. for its brazing alloy of 15 percent silver, 80 percent copper and 5 percent phosphorous (melting point 1185° F.—flow point 1300° F.). These are then maintained in juxtaposition and heated in a neutral or non-reducing atmosphere or in air somewhat above the melting point, and perferably above the flow point of the silver brazing material, resulting in a firm union of all of the component parts. Apparently there is effected some further synergistic alloying action between the tin-lead solder flushing medium and the silver-base brazing medium, and a further penetration of both of these materials and/or their resultant alloy, into the silver-cadmium oxide body results with a concomitant partial penetration of the body of the support member up to about 25 percent of its depth. The penetration depends on the time of this heating step which is preferably between about 1 to 5 minutes. This method is preferred for non-ferrous metallic supporting members.

In an alternative method, we place a tinning medium of the selected tin-lead solder adjacent to the proper face of the silver-cadmium oxide body, and immediately place on top of this a properly proportioned segment of the selected silver brazing alloy, an example of which is designated as "Easy-Flo 45" a trademark of Handy and Harman Co. for its brazing allow of 45 percent silver, 15 percent copper, 16 percent zinc, 24 percent cadmium (melting point 1125° F.—flow point 1145° F.). The silver brazing alloy is then placed against the desired face of the support member. All components then are heated in air or a neutral atmosphere (nonreducing) at a temperature somewhat above the minimum flow point of the silver brazing alloy. This method is generally preferred where ferrous support backings are involved.

Our invention results in assemblies which show superiority to assemblies heretofore produced in mechanical strength and in joints of higher electrical conductivity. The improved mechanical strength is evident from the fact that the main body of silver-cadmium oxide can be sheared from the support member shearing or breaking the main body of the silver-cadmium oxide itself above and not at the braze line obtained by our invention. Parts brazed by conventional prior art methods frequently fail through the braze zone, and may be readily separated.

Moreover, assemblies as prepared by our invention have uniformly low inherent resistance values, even after operation, whereas those prepared by prior art methods range widely from low to very high internal resistance values, before and especially after operation.

The actual voltage drop through the contact assembly itself, as measured from the back of the supporting member, through the supporting member body, through the joint between the contacting body and the contact member, and through the body of the contact member itself to the contact surface is much lower when measured on assemblies produced by our invention than those measured on assemblies made by conventional prior art methods. By our invention we also secure better overall thermal conductivity, which generally tends to reduce the deleterious effects of operational arcing, thus prolonging the service life of the contact assembly.

Our solder brazed joint does not require fluxing of the component parts in order to obtain good results, and is, therefore, less expensive than conventional brazing which does require fluxing.

In the foregoing, we have described our invention only in connection with preferred embodiments thereof. Many variations and modifications of the principles of our invention within the scope of the description herein are obvious. Accordingly we prefer to be bound not by the specific disclosure, but only by the appending claims.

We claim:

1. The method of joining an electrical contact body constituted of silver and a material selected from the group consisting of cadmium oxide, zinc oxide, tin oxide (SnO), lead oxide (PbO) and graphite, to a metallic supporting member comprising the steps of applying to at least one of the surfaces of the contact body a solder composition of a tin-lead alloy containing at least 50 percent tin, placing a quantity of a silver brazing alloy in direct contact with the tin containing solder and placing against the opposite surface of the silver brazing alloy the metallic supporting body and then heating all of the components above the melting point of the silver brazing alloy and the tin containing alloy until a satisfactorily permanent attachment is obtained between the contact and the support member to which it is attached.

2. The method of joining a silver-cadmium oxide body to a metallic supporting member comprising the steps of applying to at least one of the surfaces of the silver-cadmium oxide body a solder composition of a tin-lead alloy containing at least 50 percent tin, placing a quantity of a silver brazing alloy in direct contact with the tin containing solder and placing against the opposite surface of the silver brazing alloy the metallic supporting body and then heating all of the components above the melting point of the silver brazing alloy and the tin containing alloy until a satisfactorily permanent attachment is obtained between the silver-cadmium oxide body and the support member to which it is attached.

3. The method of claim 2 in which the tin-lead alloy contains at least 80 percent tin.

4. The method of claim 2 in which the silver brazing alloy has a melting point of at least 1000° F.

5. The method of joining a silver-cadmium oxide body to a metallic, non-ferrous supporting member comprising the steps of placing a body of a solder composition selected from the group consisting of alloys and mixtures of lead and tin, said composition containing at least 50 percent tin, upon the desired face of the silver-cadmium oxide body, heating the composite body until the face of the silver-cadmium oxide body is coated by the solder composition, and then placing on the coated surface so obtained a silver brazing alloy and against the opposite surface of the silver brazing alloy the metallic, non-ferrous supporting body and then heating the components to a temperature above the melting point of the silver brazing alloy until a satisfactory permanent attachment between the silver-cadmium oxide body and the support member to which it is attached.

6. The method of joining a silver-cadmium oxide electrical contact to an electrically conductive supporting arm comprising the steps of placing against a surface of the silver-cadmium oxide body a solder composition of a tin-lead alloy containing at least 80 percent tin, placing a quantity of silver brazing alloy in direct contact with the tin containing solder and superimposing against the opposite surface of the silver brazing alloy a ferrous metallic supporting body and then heating all the components to a temperature above the melting point of the silver brazing alloy and tin containing alloy until a satisfactorily permanent bond is obtained between the contact body and the support member to which it is attached.

7. The method of joining a silver-cadmium oxide body to a ferrous metallic supporting member comprising the steps of placing against a surface of the silver-cadmium oxide body a solder composition of a tin-lead alloy containing at least 50 percent tin, placing a quantity of silver brazing alloy in direct contact with the tin containing solder and superimposing against the opposite surface of the silver brazing alloy a ferrous metallic supporting body and then heating all the components to a temperature above the melting point of the silver brazing alloy and tin containing alloy until a satisfactorily permanent bond is obtained between the silver-cadmium oxide body and the support member to which it is attached.

References Cited in the file of this patent

UNITED STATES PATENTS

| | | |
|---|---|---|
| 2,362,893 | Durst | Nov. 14, 1944 |
| 2,386,628 | Nazzewski | Oct. 9, 1945 |
| 2,585,752 | Dorst | Feb. 12, 1952 |
| 2,724,892 | Knochel et al. | Nov. 29, 1955 |
| 2,730,594 | Page | Jan. 10, 1956 |
| 2,759,074 | Pettit | Aug. 14, 1956 |
| 2,805,944 | Bender | Sept. 10, 1957 |
| 2,888,742 | Stumbock | June 2, 1959 |